(12) United States Patent
Zhang et al.

(10) Patent No.: US 10,489,113 B2
(45) Date of Patent: Nov. 26, 2019

(54) QUICK OPERATION DEVICE FOR NONLINEAR FUNCTION, AND METHOD THEREFOR

(71) Applicant: Institute of Computing Technology, Chinese Academy of Sciences, Beijing (CN)

(72) Inventors: Shijin Zhang, Beijing (CN); Tao Luo, Beijing (CN); Shaoli Liu, Beijing (CN); Yunji Chen, Beijing (CN)

(73) Assignee: Institute of Computing Technology, Chinese Academy of Sciences, Beijing (CN)

(*) Notice: Subject to any disclaimer, the term of this patent is extended or adjusted under 35 U.S.C. 154(b) by 0 days.

(21) Appl. No.: 15/773,959

(22) PCT Filed: Jun. 17, 2016

(86) PCT No.: PCT/CN2016/086108
§ 371 (c)(1),
(2) Date: May 4, 2018

(87) PCT Pub. No.: WO2017/088457
PCT Pub. Date: Jun. 1, 2017

(65) Prior Publication Data
US 2018/0329681 A1      Nov. 15, 2018

(30) Foreign Application Priority Data
Nov. 27, 2015   (CN) .......................... 2015 1 0849130

(51) Int. Cl.
*G06F 5/01*        (2006.01)
*G06F 16/901*   (2019.01)
(Continued)

(52) U.S. Cl.
CPC .................. *G06F 5/01* (2013.01); *G06F 7/50* (2013.01); *G06F 7/523* (2013.01); *G06F 7/57* (2013.01);
(Continued)

(58) Field of Classification Search
None
See application file for complete search history.

(56) References Cited

U.S. PATENT DOCUMENTS 3,699,318 A   10/1972   Underkoffler et al.
6,041,337 A    3/2000   Whittaker
(Continued)

FOREIGN PATENT DOCUMENTS

CN       1225468 A      8/1999
CN    101056415 A    10/2007
(Continued)

OTHER PUBLICATIONS

International Search Report dated Sep. 21, 2016 in related PCT Application No. PCT/CN2016/086108.

*Primary Examiner* — Michael D. Yaary
(74) *Attorney, Agent, or Firm* — Maschoff Brennan

(57) ABSTRACT

The present disclosure provides a quick operation device for a nonlinear function, and a method therefor. The device comprises: a domain conversion part for converting an input independent variable into a corresponding value in a table lookup range; a table lookup part for looking up a slope and an intercept of the corresponding piecewise linear fitting based on the input independent variable or an independent variable processed by the domain conversion part; and a linear fitting part for obtaining, a final result in a way of linear fitting based on the slope and the intercept obtained, by means of table lookup, by the table lookup part. The present disclosure solves the problems of slow operation speed, large area of the operation device, and high power consumption caused by the traditional method.

20 Claims, 7 Drawing Sheets

(51) Int. Cl.
  *G06F 7/57* (2006.01)
  *G06F 7/50* (2006.01)
  *G06F 7/523* (2006.01)
  *G06F 17/11* (2006.01)

(52) U.S. Cl.
  CPC .......... *G06F 16/9017* (2019.01); *G06F 17/11* (2013.01)

(56) References Cited

U.S. PATENT DOCUMENTS

| | | | | |
|---|---|---|---|---|
| 6,163,791 | A | * 12/2000 | Schmookler | G06F 7/535 708/502 |
| 2002/0129072 | A1 | 9/2002 | Kato et al. | |
| 2013/0262540 | A1 | * 10/2013 | Arnold | G06F 7/544 708/235 |

FOREIGN PATENT DOCUMENTS

| CN | 103176948 A | 6/2013 |
|---|---|---|
| CN | 105354006 A | 2/2016 |

* cited by examiner

QUICK OPERATION DEVICE FOR NONLINEAR FUNCTION, AND METHOD THEREFOR

TECHNICAL FIELD

The present disclosure relates to the computer application technology, and particularly relates to a quick operation device for a nonlinear function, and a method therefor.

BACKGROUND

An arithmetic logic unit (ALU) is a structure for an integer operation. The ALU is a digital circuit specialized for executing arithmetic and logic operations in a computer. The ALU is the most important component of a central processing unit of the computer, and even a microprocessor also includes an ALU functioning to count. Modern CPU (central processing unit) and GPU (Graphics Processing Unit) have already included powerful and complicated ALUs; a single element may also include an ALU. Most of the ALUs can complete the following operations: an integer arithmetic operation (addition, subtraction, multiplication and division are sometimes included, but cost much), a bit logical operation (AND, OR, NOT, XOR), and a shift operation (shifting or floating data to left or right by certain bits), and shifting may be considered as being multiplied or divided by 2. Generally, an arithmetic logic unit only includes a linear operation part, and when the arithmetic logic unit performs complicated operations such as exponentiation operation, it often requires several operation periods.

In order to accelerate an operation speed of a processor, a FPU (Floating-Point Unit) is often integrated in a CPU and a GPU. The FPU is a processor specialized for a floating-point operation, and may support calculation of some transcendental functions, such as, $\log 2^x$. The operation speed of the FPU is much faster than the ALU.

In the prior art, when calculating a nonlinear function, a complicated operation is often divided to simply operations, and a result can be obtained after several operation periods, which makes the operation speed slow, an area of the operation device large, and power consumption high.

SUMMARY

An object of the present disclosure is to provide a quick operation device for a nonlinear function, and a method therefor for solving the problems of slow operation speed, large area of the operation device, and high power consumption caused by the traditional method.

In order to realize the above object, the present disclosure provides a quick operation device for a nonlinear function, comprising:

a domain conversion part for converting an input independent variable into a corresponding value in a table lookup range;

a table lookup part for looking up a slope and an intercept of the corresponding piecewise linear fitting based on the input independent variable or an independent variable processed by the domain conversion part; and a linear fitting part for obtaining a final result in a way of linear fitting based on the slope and the intercept obtained, by means of table lookup, by the table lookup part.

As regards to the quick operation device for a nonlinear function, the domain conversion part comprises:

a first multiplier for scaling the input independent variable;

a first adder for shifting the scaled independent variable.

As regards to the quick operation device for a nonlinear function, the linear fitting part comprises:

a second multiplier for performing a multiply operation based on the slope and the input independent variable, or the independent variable processed by the domain conversion part to obtain an operation result;

a second adder for performing an addition operation based on the operation result and the intercept to obtain the final result.

As regards to the quick operation device for a nonlinear function, it further comprises:

a first independent variable selector for selecting an independent variable used when the table lookup part performs processing.

As regards to the quick operation device for a nonlinear function, it further comprises:

a second independent variable selector for selecting an independent variable used when the second multiplier performs the multiply operation.

In order to realize the above object, the present disclosure further provides a method by using the quick operation device for a nonlinear function, wherein, the quick operation device for a nonlinear function comprises:

a domain conversion part for converting an input independent variable into a corresponding value in a table lookup range;

a table lookup part for looking up a slope and an intercept of the corresponding piecewise linear fitting based on the input independent variable or the independent variable processed by the domain conversion part; and a linear fitting part for obtaining a final result in a way of linear fitting based on the slope and the intercept obtained, by means of table lookup, by the table lookup part;

the method comprising the following steps:

step one, converting an input independent variable into a corresponding value in a table lookup range;

step two, looking up a slope and an intercept of the corresponding piecewise linear fitting based on the independent variable or an independent variable processed by the domain conversion part; and step three, obtaining a final result in a way of linear fitting based on the slope and the intercept obtained, by means of table lookup, by the table lookup part.

As regards to the method by using the quick operation device for a nonlinear function, the step one comprises:

scaling the input independent variable;

shifting the scaled independent variable.

As regards to the method by using the quick operation device for a nonlinear function, the step two comprises:

selecting an independent variable used when the table lookup part performs processing by providing a first independent variable selector.

As regards to the method by using the quick operation device for a nonlinear function, the step three comprises:

performing a multiply operation based on the slope and the input independent variable, or the independent variable processed by the domain conversion part to obtain an operation result;

performing an addition operation based on the operation result and the intercept to obtain the final result.

As regards to the method by using the quick operation device for a nonlinear function, the step three comprises:

selecting an independent variable used when performing the multiply operation by providing a second independent variable selector.

In order to realize the above object, the present disclosure further provides a processing unit comprising the quick operation device for a nonlinear function, wherein, the quick operation device for a nonlinear function comprising:

a domain conversion part for converting an input independent variable into a corresponding value in a table lookup range;

a table lookup part for looking up a slope and an intercept of the corresponding piecewise linear fitting based on the input independent variable or the independent variable processed by the domain conversion part; and a linear fitting part for obtaining a final result in a way of linear fitting based on the slope and the intercept obtained, by means of table lookup, by the table lookup part.

As regards to the processing unit comprising the quick operation device for a nonlinear function, wherein the domain conversion part comprises:

a first multiplier for scaling the input independent variable;

a first adder for shifting the scaled independent variable.

As regards to the processing unit comprising the quick operation device for a nonlinear function, wherein the linear fitting part comprises:

a second multiplier for performing a multiply operation based on the slope and the input independent variable, or the independent variable processed by the domain conversion part to obtain an operation result;

a second adder for performing an addition operation based on the operation result and the intercept to obtain the final result.

As regards to the processing unit comprising the quick operation device for a nonlinear function, further comprising:

a first independent variable selector for selecting an independent variable used when the table lookup part performs processing.

As regards to the processing unit comprising the quick operation device for a nonlinear function, further comprising:

a second independent variable selector for selecting an independent variable used when the second multiplier performs the multiply operation.

In order to realize the above object, the method for a nonlinear function by using the processing unit, wherein, the processing unit is a central processor unit or a graphic processor unit;

the central processor unit or the graphic processor unit comprising:

a domain conversion part for converting an input independent variable into a corresponding value in a table lookup range;

a table lookup part for looking up a slope and an intercept of the corresponding piecewise linear fitting based on the input independent variable or the independent variable processed by the domain conversion part; and a linear fitting part for obtaining a final result in a way of linear fitting based on the slope and the intercept obtained, by means of table lookup, by the table lookup part;

the method for a nonlinear function comprising the following steps:

step one, converting an input independent variable into a corresponding value in a table lookup range;

step two, looking up a slope and an intercept of the corresponding piecewise linear fitting based on the independent variable or an independent variable processed by the domain conversion part; and step three, obtaining a final result in a way of linear fitting based on the slope and the intercept obtained, by means of table lookup, by the table lookup part.

As regards to the method for a nonlinear function by using the processing unit, wherein the step one comprises:

scaling the input independent variable;

shifting the scaled independent variable.

As regards to the method for a nonlinear function by using the processing unit, wherein the step two comprises:

selecting an independent variable used when the table lookup part performs processing by providing a first independent variable selector.

As regards to the method for a nonlinear function by using the processing unit, wherein the step three comprises:

performing a multiply operation based on the slope and the input independent variable, or the independent variable processed by the domain conversion part to obtain an operation result;

performing an addition operation based on the operation result and the intercept to obtain the final result.

As regards to the method for a nonlinear function by using the processing unit, wherein the step three comprises:

selecting an independent variable used when performing the multiply operation by providing a second independent variable selector.

DETAILED DESCRIPTION

The present disclosure is explained in detail below with reference to the drawings and the specific embodiments, but it is not limited thereto.

Figure 1:
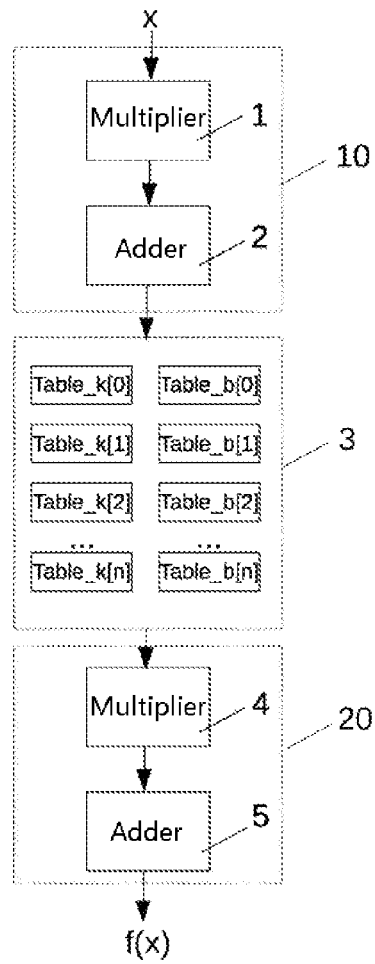
FIG. 1 is a structure diagram of a quick operation device for a nonlinear function according to the present disclosure.

As shown in FIG. 1 showing a structure of a quick operation device for a nonlinear function according to the present disclosure, the quick operation device mainly comprises three parts: a first part, a second part, and a third part.

The first part is used for converting a domain, and is realized by a domain conversion part 10, which comprises a multiplier 1 and an adder 2 and converts an input independent variable into a corresponding value in a table lookup range; the second part is a table lookup, and is realized by a table lookup part 3, which looks up a slope and an intercept of the corresponding piecewise linear fitting based on the independent variable value input from the first part; the third part is linear fitting, and is realized by a linear fitting part 20, which comprises a multiplier 4 and an adder 5 and obtains a final result in a way of linear fitting based on the slope and the intercept obtained, by means of table lookup, by the second part.

The multiplier 1 is used for scaling the input domain.

The adder 2 is used for shifting the input domain.

The table lookup part 3 is used for looking up a slope and an intercept of a straight line corresponding to an input.

The multiplier 4 is used for calculating k*x.

The adder 5 is used for calculating k*x+b.

The quick operation of a nonlinear function may be performed according to following conditions:

(1) The domain needs to be converted, and the input domain of piecewise linear fitting is an input data of the first part.

(2) The domain needs to be converted, and the input domain of piecewise linear fitting is an output data of the first part.

(3) There is no need to convert the domain.

(4) The domain needs to be converted, and linear fitting may select a value of the domain before or after conversion.

(5) Whether the domain is converted can be selected, and linear fitting may select a value of the domain before or after conversion.

Figure 2:
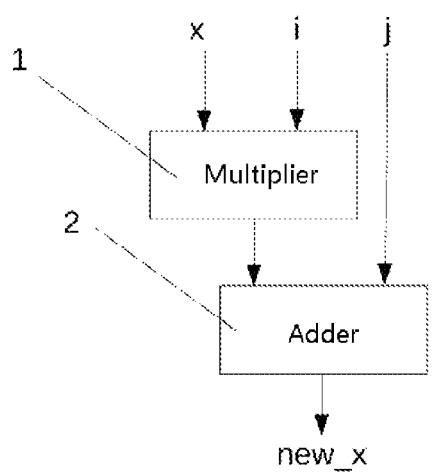
FIG. 2 is an internal structure diagram of a domain conversion part according to the present disclosure.

As shown in FIG. 2 showing an internal structure of a domain conversion part according to the present disclosure, the internal structure of the domain conversion part is as follows:

As shown in the figure, the domain conversion part 10 is for conversion of a domain, and has three inputs x, i, and j, wherein x is an independent variable of a nonlinear function, i and j are two constants associated with a domain range of the nonlinear function, and new_x is an output result after a domain is converted. An operation realized by the domain conversion part 10 is new_x=x*i+j, and the purpose of converting a domain is to facilitate the subsequent table lookup operation.

Figure 3:
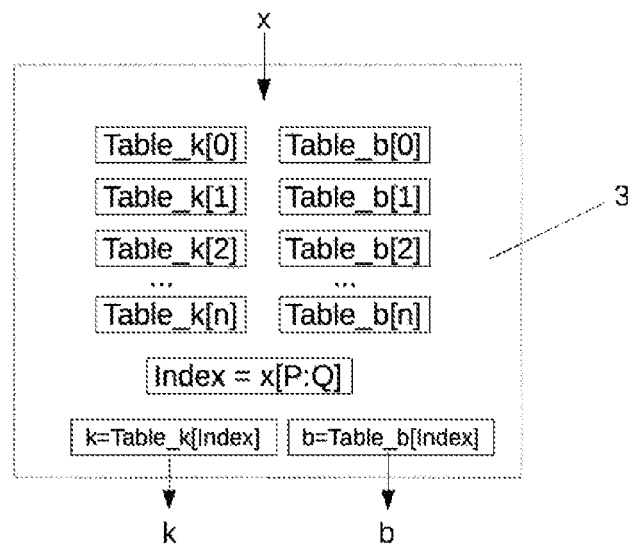
FIG. 3 is an internal structure diagram of a table lookup part according to the present disclosure.

As shown in FIG. 3 showing an internal structure of a table lookup part according to the present disclosure, the internal structure of the table lookup part is as follows:

As shown in the figure, the input of the table lookup part 3 is an independent variable of a nonlinear function, or an independent variable after a conversion of a domain.

Table_k and Table_b store the slope and the intercept of a straight line which is a piecewise linear fitting of a nonlinear function, the values in Table_k and Table_b are configurable, and before starting to calculate, the values shall have been configured.

The table lookup part 3, based on some bits of the input x, such as, the bits P-Q of x as an index, outputs results k and b after table lookup. Operations realized by the table lookup part 3 are index=x[P:Q], k=Table_k[index], and b=Table_b[index].

Figure 4:
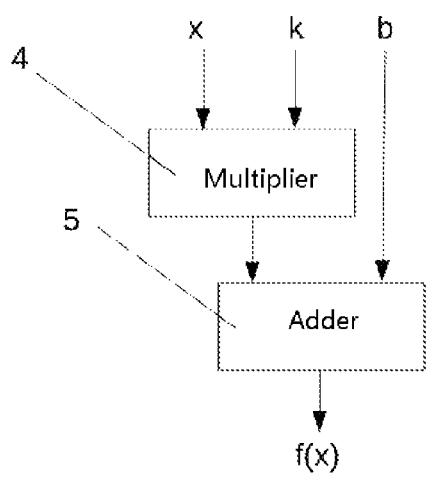
FIG. 4 is an internal structure diagram of a linear fitting part according to the present disclosure.

As shown in FIG. 4 showing an internal structure diagram of a linear fitting part according to the present disclosure, the internal structure of the linear fitting part is as follows:

As shown in the figure, the module of the linear fitting part 20 has three inputs, wherein x represents an independent variable which may be converted, or may be not converted, and k and b are the slope and the intercept obtained by means of table lookup. An output is the final result f(x), and an operation realized by the linear fitting part 20 is f(x)=k*x+b.

Figure 5:
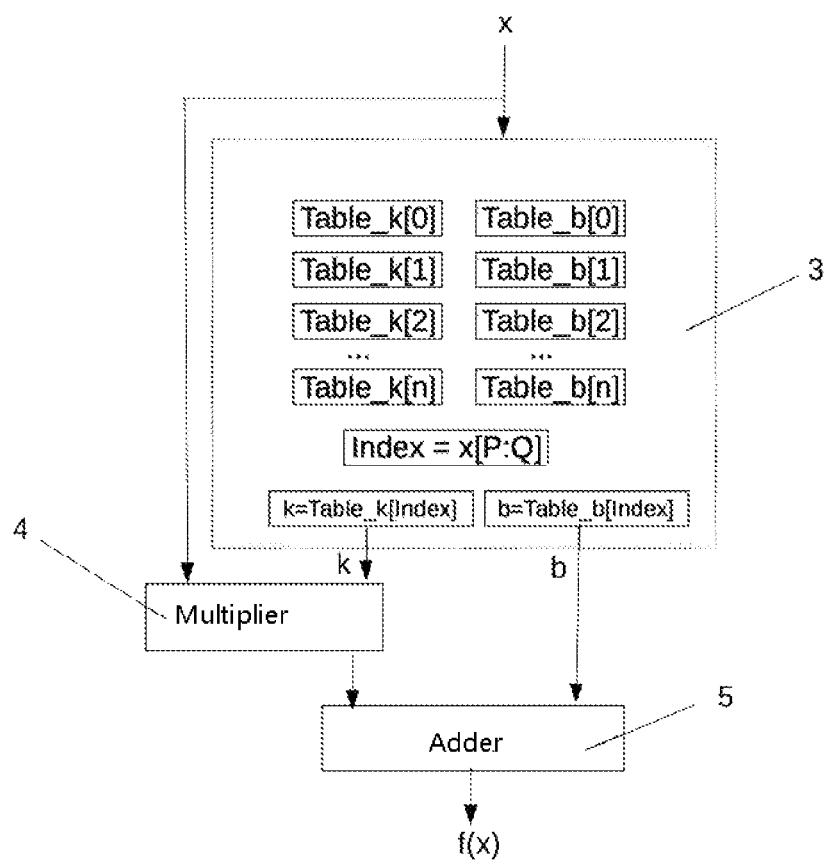
FIG. 5 is a first embodiment of quick operation for the nonlinear function according to the present disclosure.

As shown in FIG. 5, it is a first embodiment of quick operation for a nonlinear function according to the present disclosure.

In this embodiment, the input of the table lookup part 3 is an independent variable x, and the table lookup part 3 looks up the corresponding slope k and intercept b based on the value of x, and then outputs k and b; the multiplier 4 calculates k*x, and outputs the result and b; the adder 5 calculates k*x+b, and obtains the final result.

Figure 6:
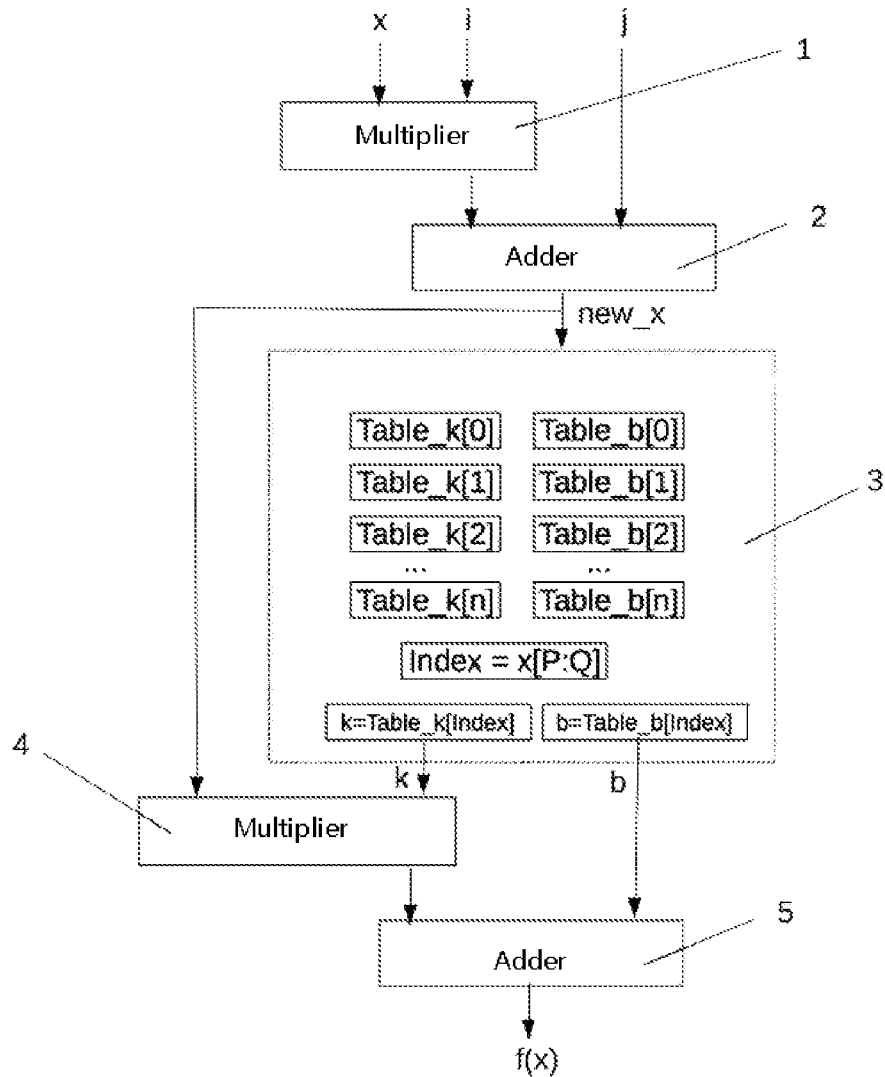
FIG. 6 is a second embodiment of quick operation for the nonlinear function according to the present disclosure.

As shown in FIG. 6, it is a second embodiment of quick operation for a nonlinear function according to the present disclosure.

In this embodiment, the multiplier 1 scales an input independent variable x, the adder 2 shifts the input independent variable x, an input of the table lookup part 3 is an output of the adder 2. The table lookup part 3 looks up the corresponding slope k and intercept b based on an output value of the adder 2, and outputs k and b; the multiplier 4 calculates k*new_x, and outputs the result and b; the adder 5 calculates k*new_x+b, and obtains the final result.

Figure 7:
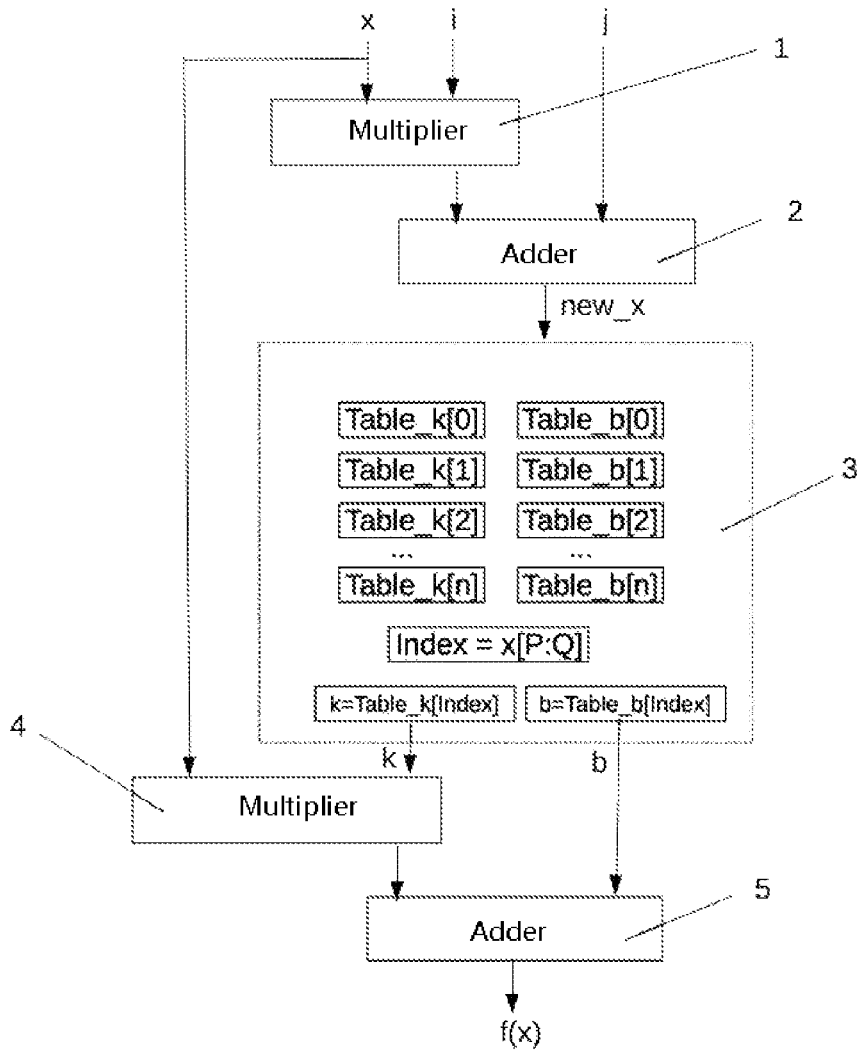
FIG. 7 is a third embodiment of quick operation for the nonlinear function according to the present disclosure.

As shown in FIG. 7, it is a third embodiment of quick operation for a nonlinear function according to the present disclosure.

In this embodiment, the multiplier 1 scales an input independent variable x, the adder 2 shifts the input independent variable x, an input of the table lookup part 3 is an output of the adder 2. The table lookup part 3 looks up the corresponding slope k and intercept b based on the output value of the adder 2, and outputs k and b; the multiplier 4 calculates k*x, and outputs the result and b; the adder 5 calculates k*x+b, and obtains the final result.

Figure 8:
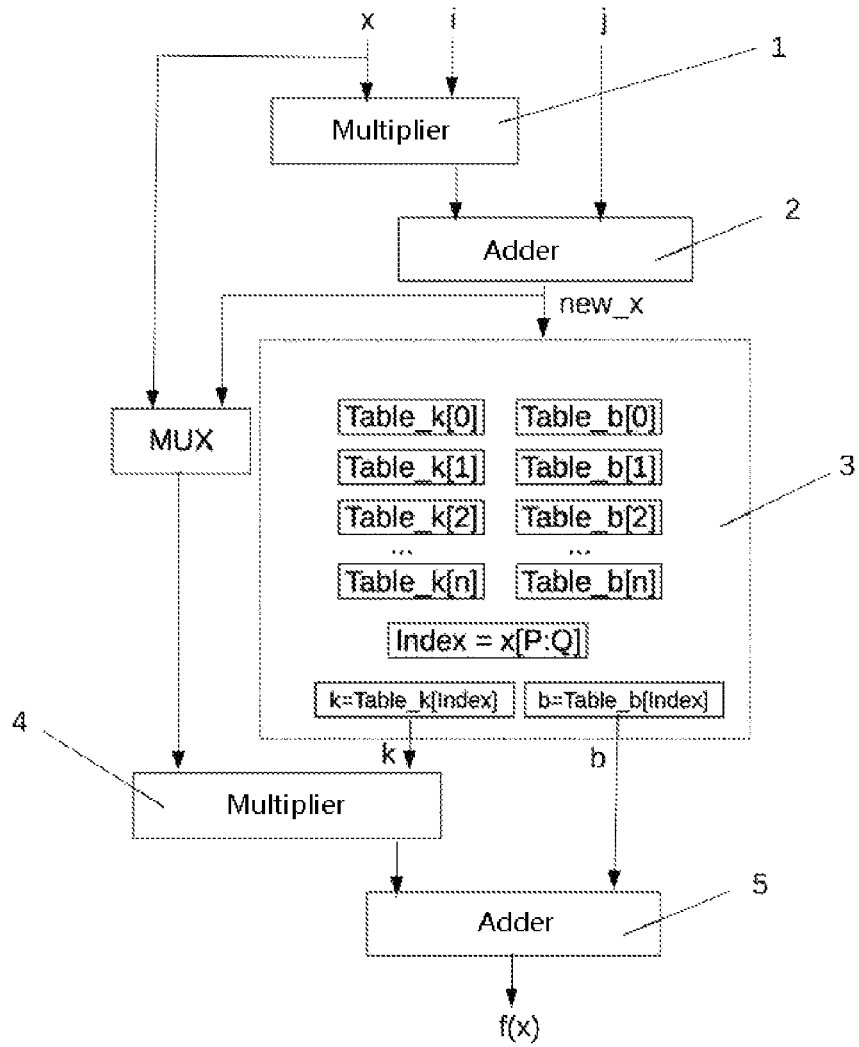
FIG. 8 is a fourth embodiment of quick operation for the nonlinear function according to the present disclosure.

As shown in FIG. 8, it is a fourth embodiment of quick operation for a nonlinear function according to the present disclosure.

In this embodiment, the multiplier 1 scales an input independent variable x, the adder 2 shifts the input independent variable x, an input of the table lookup part 3 is an output of the adder 2. The table lookup part 3 looks up the corresponding slope k and intercept b based on the output value of the adder 2, and outputs k and b; the multiplier 4 calculates k*x or k*new_x, and outputs the result and b; the adder 5 calculates k*x+b or k*new_x+b, and obtains the final result.

In this embodiment, an independent variable selector MUX is provided to select the input independent variable x or the independent variable new_x output from the adder 2 as an independent variable which is desired for the multiplier 4 to operate.

Figure 9:
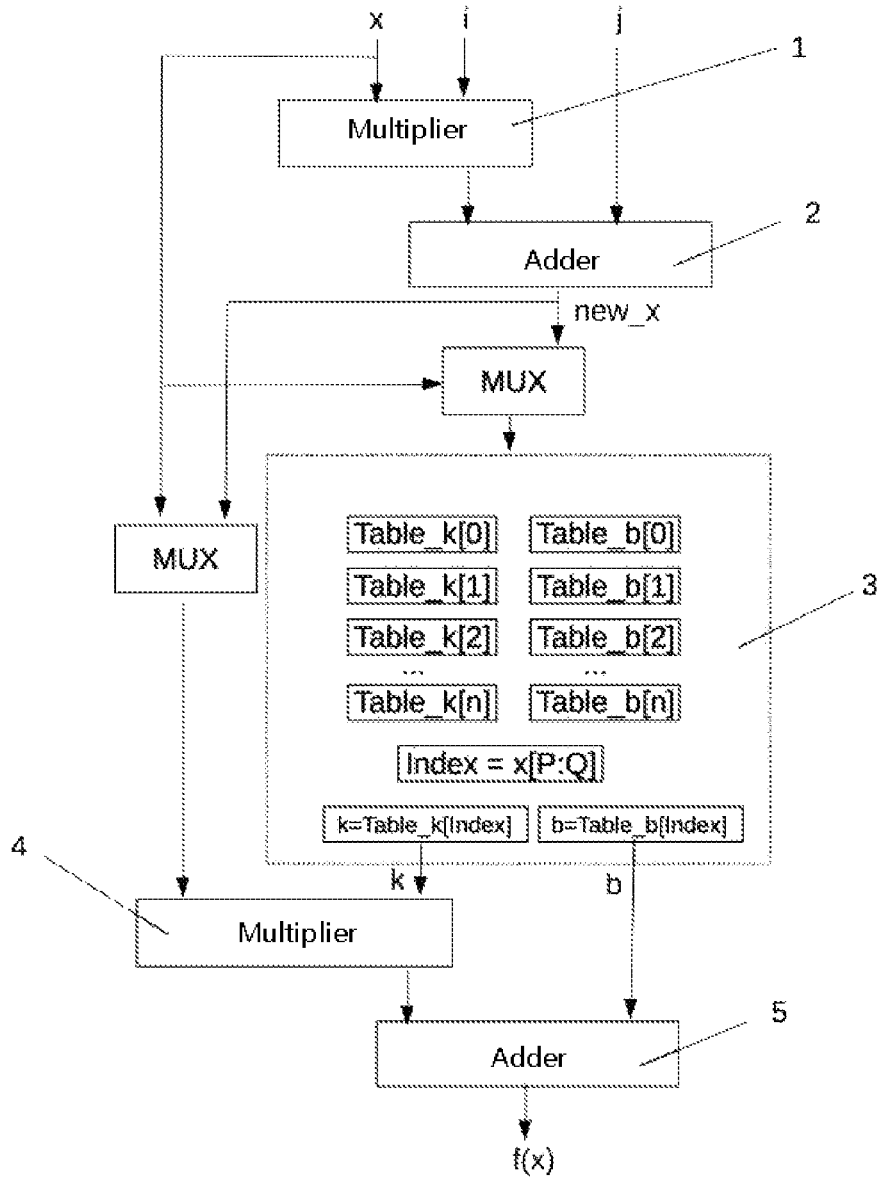
FIG. 9 is a fifth embodiment of quick operation for the nonlinear function according to the present disclosure.

As shown in FIG. 9, it is a fifth embodiment of quick operation for a nonlinear function according to the present disclosure.

In this embodiment, the multiplier 1 scales an input independent variable x, the adder 2 shifts the input independent variable x, the input of the table lookup part 3 may select the original input x, or new_x which is converted from the domain. The table lookup part 3 looks up the corresponding slope k and intercept b based on the input and output values, and outputs k and b; the multiplier 4 calculates k*x or k*new_x, and outputs the result and b; the adder 5 calculates k*x+b or k*new_x+b, and obtains the final result.

In this embodiment, an independent variable selector MUX is provided to select the input independent variable x or the independent variable new_x output from the adder 2 as an input of the table lookup part 3, and another independent variable selector MUX is provided to select the input independent variable x or the independent variable new_x output from the adder 2 as an independent variable which is desired for the multiplier 4 to operate.

The effect of the present disclosure is further explained through one specific example below.

$$\frac{1}{1+e^{-x}}$$

As stated above, it can be known that when calculating the above nonlinear function, the required calculating steps comprise table lookup, multiplication and addition.

The operation steps required in the FPU are:
1. performing bit inversion: x=−x.
2. calculating log $2^x$.
3. calculating log $2^e$.
4. performing a division operation: a result of step 2 is divided by a result of step 3.
5. adding 1 to a result of step 4.
6. dividing 1 by a result of step 5.

As can be seen from the above operation, advantages of the present disclosure are as follows:

(1) accelerating calculating procedures.

(2) avoiding complicated hardware design, such as, an operation part of log $2^x$, and reducing a chip area and power consumption. The present disclosure provides a quick operation method for a nonlinear function, which quickly calculates the nonlinear function by means of a linearly fitted method of the section, can solve the problems of slow operation speed, large area of the operation device, and high power consumption brought by the traditional method, and is specifically embodied as follows:

(1) simplifying hardware design, and improving the operation speed.

(2) reducing power consumption and area of the chip.

The invention claimed is:

1. A quick operation device for a nonlinear function, comprising:
   a domain conversion part for converting an input independent variable into a corresponding value in a table lookup range;
   a table lookup part for looking up a slope and an intercept of a corresponding piecewise linear fitting based on the input independent variable or the independent variable processed by the domain conversion part; and
   a linear fitting part for obtaining a final result in a way of linear fitting based on the slope and the intercept obtained, by means of table lookup, by the table lookup part;
   wherein the domain conversion part is for conversion of a domain, and has three inputs x, i, and j, x is an independent variable of a nonlinear function, i and j are two constants associated with a domain range of the nonlinear function, and new_x is an output result after a domain is converted, an operation realized by the domain conversion part is new_x=x*i+j;
   operations realized by the table lookup part are index=x[P:Q], k=Table_k[index], and b=Table_b[index], x[P:Q] is the bits P-Q of x, Table_k and Table_b store the slope and the intercept of a straight line which is a piecewise linear fitting of a nonlinear function;
   an operation realized by the linear fitting part is f(x)=k*new_x+b.

2. The quick operation device for a nonlinear function according to claim 1, wherein the domain conversion part comprises:
   a first multiplier for scaling the input independent variable;
   a first adder for shifting the scaled independent variable.

3. The quick operation device for a nonlinear function according to claim 1, wherein the linear fitting part comprises:
   a second multiplier for performing a multiply operation based on the slope and the input independent variable, or the independent variable processed by the domain conversion part to obtain an operation result;
   a second adder for performing an addition operation based on the operation result and the intercept to obtain the final result.

4. The quick operation device for a nonlinear function according to claim 1, further comprising:
   a first independent variable selector for selecting an independent variable used when the table lookup part performs processing.

5. The quick operation device for a nonlinear function according to claim 3, further comprising:
   a second independent variable selector for selecting an independent variable used when the second multiplier performs the multiply operation.

6. A method for using a quick operation device for a nonlinear function, wherein the quick operation device for a nonlinear function comprises:
   a domain conversion part for converting an input independent variable into a corresponding value in a table lookup range;
   a table lookup part for looking up a slope and an intercept of a corresponding piecewise linear fitting based on the input independent variable or the independent variable processed by the domain conversion part; and
   a linear fitting part for obtaining a final result in a way of linear fitting based on the slope and the intercept obtained, by means of table lookup, by the table lookup part;
   the method comprising the following steps:
   step one, converting an input independent variable into a corresponding value in a table lookup range;
   step two, looking up a slope and an intercept of the corresponding piecewise linear fitting based on the independent variable or an independent variable processed by the domain conversion part; and
   step three, obtaining a final result in a way of linear fitting based on the slope and the intercept obtained, by means of table lookup, by the table lookup part;
   wherein the domain conversion part is for conversion of a domain, and has three inputs x, i, and j, x is an independent variable of a nonlinear function, i and j are two constants associated with a domain range of the nonlinear function, and new_x is an output result after a domain is converted, an operation realized by the domain conversion part is new_x=x*i+j;
   operations realized by the table lookup part are index=x[P:Q], k=Table_k[index], and b=Table_b[index], x[P:Q] is the bits P-Q of x, Table_k and Table_b store the slope and the intercept of a straight line which is a piecewise linear fitting of a nonlinear function;
   an operation realized by the linear fitting part is f(x)=k*new_x+b.

7. The method for using the quick operation device for a nonlinear function according to claim 6, wherein the step one comprises:
   scaling the input independent variable; and
   shifting the scaled independent variable.

8. The method for using the quick operation device for a nonlinear function according to claim 6, wherein the step two comprises:

selecting an independent variable used when the table lookup part performs processing by providing a first independent variable selector.

9. The method for using the quick operation device for a nonlinear function according to claim 6, wherein the step three comprises:
performing a multiply operation based on the slope and the input independent variable, or the independent variable processed by the domain conversion part to obtain an operation result; and
performing an addition operation based on the operation result and the intercept to obtain the final result.

10. The method for using the quick operation device for a nonlinear function according to claim 6, wherein the step three comprises selecting an independent variable used when performing the multiply operation by providing a second independent variable selector.

11. A processing unit comprising a quick operation device for a nonlinear function, wherein the quick operation device for a nonlinear function comprises:
a domain conversion part for converting an input independent variable into a corresponding value in a table lookup range;
a table lookup part for looking up a slope and an intercept of a corresponding piecewise linear fitting based on the input independent variable or the independent variable processed by the domain conversion part; and
a linear fitting part for obtaining a final result in a way of linear fitting based on the slope and the intercept obtained, by means of table lookup, by the table lookup part;
wherein the domain conversion part is for conversion of a domain, and has three inputs x, i, and j, x is an independent variable of a nonlinear function, i and j are two constants associated with a domain range of the nonlinear function, and new_x is an output result after a domain is converted, an operation realized by the domain conversion part is new_x=x*i+j;
operations realized by the table lookup part are index=x[P:Q], k=Table_k[index], and b=Table_b[index], x[P:Q] is the bits P-Q of x, Table_k and Table_b store the slope and the intercept of a straight line which is a piecewise linear fitting of a nonlinear function;
an operation realized by the linear fitting part is f(x)=k*new_x+b.

12. The processing unit comprising the quick operation device for a nonlinear function according to claim 11, wherein the domain conversion part comprises:
a first multiplier for scaling the input independent variable; and
a first adder for shifting the scaled independent variable.

13. The processing unit comprising the quick operation device for a nonlinear function according to claim 11, wherein the linear fitting part comprises:
a second multiplier for performing a multiply operation based on the slope and the input independent variable, or the independent variable processed by the domain conversion part to obtain an operation result; and
a second adder for performing an addition operation based on the operation result and the intercept to obtain the final result.

14. The processing unit comprising the quick operation device for a nonlinear function according to claim 11, further comprising:
a first independent variable selector for selecting an independent variable used when the table lookup part performs processing.

15. The processing unit comprising the quick operation device for a nonlinear function according to claim 13, further comprising:
a second independent variable selector for selecting an independent variable used when the second multiplier performs the multiply operation.

16. A method for a nonlinear function by using a processing unit, wherein the processing unit is a central processor unit or a graphic processor unit, the central processor unit or the graphic processor unit comprising:
a domain conversion part for converting an input independent variable into a corresponding value in a table lookup range;
a table lookup part for looking up a slope and an intercept of a corresponding piecewise linear fitting based on the input independent variable or the independent variable processed by the domain conversion part; and
a linear fitting part for obtaining a final result in a way of linear fitting based on the slope and the intercept obtained, by means of table lookup, by the table lookup part;
the method comprising the following steps:
step one, converting an input independent variable into a corresponding value in a table lookup range;
step two, looking up a slope and an intercept of the corresponding piecewise linear fitting based on the independent variable or an independent variable processed by the domain conversion part; and
step three, obtaining a final result in a way of linear fitting based on the slope and the intercept obtained, by means of table lookup, by the table lookup part;
wherein the domain conversion part is for conversion of a domain, and has three inputs x, i, and j, x is an independent variable of a nonlinear function, i and j are two constants associated with a domain range of the nonlinear function, and new_x is an output result after a domain is converted, an operation realized by the domain conversion part is new_x=x*i+j;
operations realized by the table lookup part are index=x[P:Q], k=Table_k[index], and b=Table_b[index], x[P:Q] is the bits P-Q of x, Table_k and Table_b store the slope and the intercept of a straight line which is a piecewise linear fitting of a nonlinear function;
an operation realized by the linear fitting part is f(x)=k*new_x+b.

17. The method for a nonlinear function by using the processing unit according to claim 16, wherein the step one comprises:
scaling the input independent variable; and
shifting the scaled independent variable.

18. The method for a nonlinear function by using the processing unit according to claim 16, wherein the step two comprises:
selecting an independent variable used when the table lookup part performs processing by providing a first independent variable selector.

19. The method for a nonlinear function by using the processing unit according to claim 16, wherein the step three comprises:
performing a multiply operation based on the slope and the input independent variable, or the independent variable processed by the domain conversion part to obtain an operation result; and
performing an addition operation based on the operation result and the intercept to obtain the final result.

20. The method for a nonlinear function by using the processing unit according to claim 16, wherein the step three comprises:

selecting an independent variable used when performing the multiply operation by providing a second independent variable selector.

\* \* \* \* \*